United States Patent
Dhanavath et al.

(10) Patent No.: US 10,834,003 B2
(45) Date of Patent: Nov. 10, 2020

(54) SYSTEMS AND METHODS FOR ADAPTIVE BANDWIDTH THROTTLING

(71) Applicant: Druva, Inc., Sunnyvale, CA (US)

(72) Inventors: Saida Dhanavath, Telangana (IN); Aalop Suresh Shah, Maharashtra (IN); Ashish Kumar Saxena, Maharashtra (IN)

(73) Assignee: DRUVA INC., Sunnyvale, CA (US)

( * ) Notice: Subject to any disclaimer, the term of this patent is extended or adjusted under 35 U.S.C. 154(b) by 227 days.

(21) Appl. No.: 16/000,782

(22) Filed: Jun. 5, 2018

(65) Prior Publication Data

US 2019/0222525 A1    Jul. 18, 2019

(30) Foreign Application Priority Data

Jan. 17, 2018    (IN) .............................. 201821001989

(51) Int. Cl.
| | | |
|---|---|---|
| *G06F 15/16* | (2006.01) | |
| *H04L 12/825* | (2013.01) | |
| *H04L 29/06* | (2006.01) | |
| *H04L 12/911* | (2013.01) | |
| *H04L 12/927* | (2013.01) | |
| *H04L 12/801* | (2013.01) | |

(52) U.S. Cl.
CPC .......... *H04L 47/263* (2013.01); *H04L 47/745* (2013.01); *H04L 47/781* (2013.01); *H04L 47/822* (2013.01); *H04L 67/42* (2013.01); *H04L 69/24* (2013.01); *H04L 69/28* (2013.01); *H04L 47/15* (2013.01); *H04L 47/801* (2013.01)

(58) Field of Classification Search
USPC .......................................................... 709/233
See application file for complete search history.

(56) References Cited

U.S. PATENT DOCUMENTS

| | | | | |
|---|---|---|---|---|
| 7,453,801 | B2 * | 11/2008 | Taneja | H04L 47/14 370/229 |
| 9,781,046 | B1 * | 10/2017 | Pawlukowsky | H04L 47/2491 |
| 10,447,594 | B2 * | 10/2019 | Kim | H04L 49/70 |
| 10,630,553 | B2 * | 4/2020 | Thompson | H04L 43/0882 |
| 2004/0071085 | A1 * | 4/2004 | Shaham | H04L 1/0002 370/230 |
| 2007/0097987 | A1 * | 5/2007 | Rey | H04L 69/28 370/395.52 |
| 2011/0066752 | A1 * | 3/2011 | Lippincott | H04L 43/106 709/233 |
| 2018/0123905 | A1 * | 5/2018 | Ansari | G06F 16/68 |
| 2018/0367607 | A1 * | 12/2018 | Gakhar | H04L 41/0668 |

* cited by examiner

*Primary Examiner* — Anthony Mejia
(74) *Attorney, Agent, or Firm* — Fenwick & West LLP

(57) ABSTRACT

Aspects of the current patent document include systems and methods to adaptive bandwidth throttling, for example, for use in data backup systems and data recovery systems. In embodiments, bandwidth estimation can be performed while sending data. In embodiments, the bandwidth estimation is used in data backups to send data to be backed up. In embodiments, a server performs network bandwidth estimation by receiving relatively small data packets and estimating bandwidth until bandwidth reliability conditions are satisfied.

20 Claims, 6 Drawing Sheets

SYSTEMS AND METHODS FOR ADAPTIVE BANDWIDTH THROTTLING

CROSS-REFERENCE TO RELATED APPLICATION

This patent application claims the priority benefit of co-pending and commonly-owned Indian Provisional Application 201821001989, filed on Jan. 17, 2018, entitled "SYSTEMS AND METHODS FOR ADAPTIVE BANDWIDTH THROTTLING," and listing Saida Dhanavath, Aalop Suresh Shah, and Ashish Kumar Saxena as inventors, which patent document is incorporated by reference herein in its entirety and for all purposes.

BACKGROUND

A. Technical Field

The present invention relates generally to data backup, and relates more particularly to adaptive bandwidth throttling.

B. Description of the Related Art

As the value and use of information continues to increase, individuals and businesses seek additional ways to process and store and search information. One option available to users is information handling systems. An information handling system generally processes, compiles, stores, searches, backups, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, backed up, or communicated. The variations in information handling systems allow for information handling systems to be general or configured for a specific user or specific use, such as financial transaction processing, airline reservations, enterprise data storage, global communications, data backups, or storage. In addition, information handling systems may include a variety of hardware and software components that may be configured to process, store, and communicate information and may include one or more computer systems, data storage systems, and networking systems.

Information handling systems also need a mechanism to back up the information or data on the system. Data backups are useful in the event of physical or virtual loss of information. However, data backups are often run in the background while other applications run as well. Data backups are useful in the event of a loss and therefore necessary for peace of mind. Since the backup is only used in the event of a loss, the backup typically takes relatively low priority in terms of network bandwidth so that other more mission critical and time sensitive applications can take higher priority.

For example, email applications are typically tier one applications taking a high rank in terms of network bandwidth priority. Backup operations are typically a tier three application, taking a relatively lower priority in terms of network bandwidth.

However, network bandwidth across multiple networks can be difficult to predict.

Accordingly, what is needed are systems and methods that improve bandwidth estimation and therefore improve bandwidth usage.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
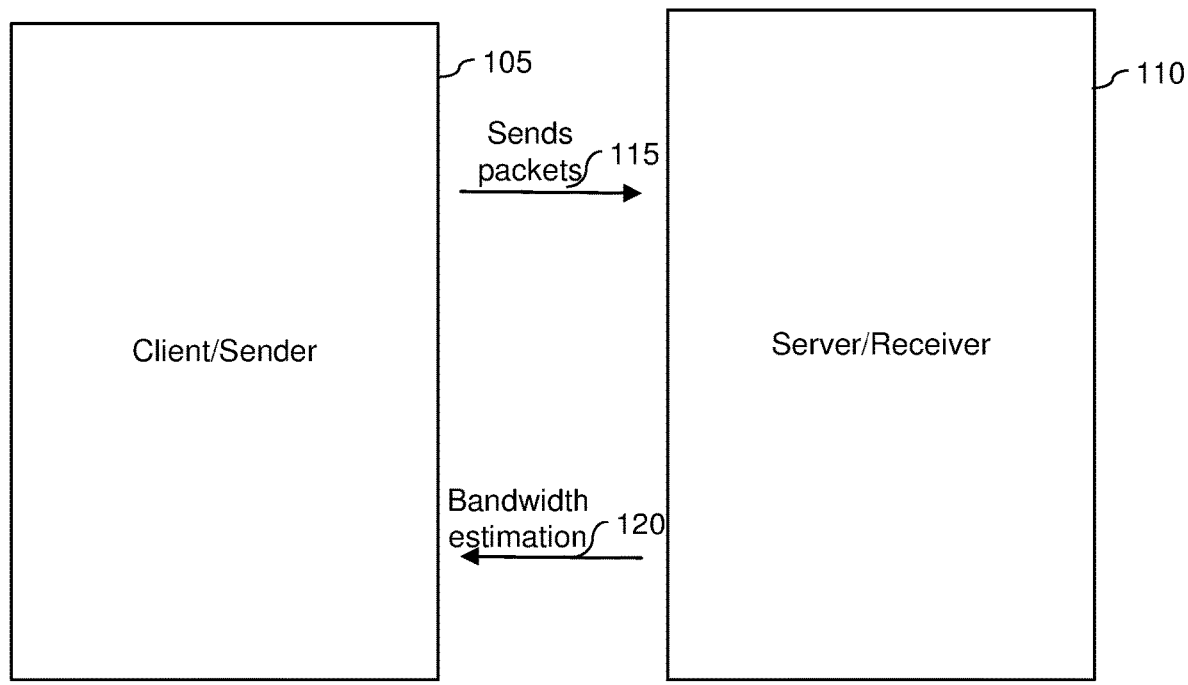
FIG. 1 depicts a high-level block diagram of a client-server backup system according to embodiments in this patent document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system/device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "link," "linked," "coupled," "connected," "communicatively coupled," or their variants shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

The present invention relates in various embodiments to devices, systems, methods, and instructions stored on one or more non-transitory computer-readable media involving bandwidth estimation. Such devices, systems, methods, and instructions stored on one or more non-transitory computer-readable media can result in, among other advantages, bandwidth estimation.

FIG. 1 depicts a high-level block diagram of a client-server backup system 100 according to embodiments in this patent document. FIG. 1 shows a client-server backup system 100, where a client 105 can be backed up onto a server 110. While FIG. 1 is described with respect to a data backup system, FIG. 1 also applies to a data recovery system or any system where data is sent.

In embodiments, backups are performed on a client device 105. Client device 105 can be any device connected to a network, for example, a laptop, Personal Computer (PC), tablet, phone, game system, watch, wearable computer, set top box, media device, etc. Many client devices 105 are mobile devices that can easily be moved from one network to another. For example, in an enterprise environment an employee can have a laptop computer used for work. That laptop can be used at the company's headquarters. It can also be used at a remote office, at home, or in the field. In each of those scenarios the laptop can be connected to a different network having a different set of bandwidth limitations. Further, even within one network, there can be different bandwidth limitations at different times. For example, on a Friday where many employees work from home, there may greater available bandwidth than on a day with the company is holding an all hands meeting and every employee is connected in the office.

Since backup systems can backup client devices 105, the backup is required to work around the bandwidth constraints of the various networks involved. In the example of the laptop being connected only at the headquarters, the network bandwidth can be known and the backup can operate in the background. However, in the example where the laptop is connected to a home network or a remote office, the network bandwidth is not known.

In the prior art systems, a set bandwidth rule is applied. For example, the rule of do not cross the threshold of 1 Mbps. However, in some instances the threshold can be too high and in others the threshold can be too low.

For some enterprise backups, the enterprise system allows the back up to use a certain percentage of available bandwidth (bandwidth limit), q %, for example 30% or 40% of available bandwidth. Without knowing the bandwidth, the backup system cannot know if it is meeting those requirements. If the backup is using too little of the available bandwidth, then the backup process is less efficient and will operate more slowly. If the backup is using too much of the available bandwidth, then other, perhaps higher tier applications, will suffer bandwidth loss and suffer a degradation in performance. Similarly, there are bandwidth constraints when performing a data restore operation.

Accordingly, a more accurate way to estimate bandwidth is needed.

In embodiments, the bandwidth estimation method can be able to estimate available bandwidth using backup data only. If the bandwidth estimation is done on additional (non-backup) data, then the backup process is less efficient as non-application data will consume some bandwidth.

The bandwidth estimation can be a continuous process. The backup application can react to changes in available bandwidth, and adjust (increase or decrease) its bandwidth usage accordingly. If bandwidth estimation is not a continuous process, and backup application fails to react to changes in available bandwidth, then the backup will be less efficient. For example, if there is an increase in available bandwidth (for example, bandwidth made available by other applications or users), or the backup process will impact other higher tier applications (for example, a higher tier application is started later), then the backup process is less efficient.

The backup application should limit its bandwidth usage to the configured bandwidth usage limit even while estimating available bandwidth. If the bandwidth estimation uses more than the allowed bandwidth, then the backup application will impact other higher tier applications.

FIG. 1 shows client 105 sending a data 115 packet to server 110. In embodiments, client 105 sends a small packet 115 to server 110. A small packet is small relative to an expected bandwidth prediction.

For example, assume the network bandwidth is 10 Megabits per second. However, the network bandwidth is an unknown to the devices on the network and the server. For limiting the backup to use maximum q % (bandwidth limit) of the network bandwidth, the network bandwidth should be estimated. In embodiments, in order to perform that estimation, the client can determine how to break up the data to send to the server. For example, the client can send a packet having a payload of size P bits. The server can determine the estimated bandwidth, E 120. This process of bandwidth estimation can be repeated with each iteration changing the packet size P using a mathematical formula F until the estimate is reliable according to an estimate reliability criteria C.

One example of a reliable bandwidth estimate criteria is the size of the payload (P) on which the bandwidth was estimated is sufficiently large to get correct estimates. That is, size of the payload on which bandwidth was estimated is greater than some fraction (1/x) of the data that can be send in a second when transferred at the rate equal to the estimated bandwidth. Another example of a reliable estimate criteria is when there is no further improvement in bandwidth estimates by increasing the payload size. Improvement in estimates are getting better by very small rate, i.e., error rate from the previous bandwidth estimate to the current bandwidth estimate is within an acceptable threshold. Once the estimate is reliable (based on the reliability criteria), P bits of data will be transferred as a single payload.

If the estimate reliability criteria is not met, then: change P by using the mathematical formula F (e.g., increase P by y bits in above example). Once the bandwidth estimation has been determined to be reliable (when one of the above conditions is satisfied), then in embodiments, the adjustment phase begins.

In the adjustment phase, changes in subsequent reliable estimates are used to adjust the bandwidth usage limit L. In this phase, previous reliable estimate is tracked in $E_{prev}$, new reliable estimate is $E_{new}$, and change in subsequent reliable estimates $E_{prev}$ and $E_{new}$ is used to adjust the bandwidth usage limit L. If the new estimate is less that previous estimate, i.e., $E_{new}<E_{prev}$, then the bandwidth usage limit L can be decreased. L can be decreased only by a factor, for example by a multiplier, a.

If the new estimate is greater than previous estimate, i.e., $E_{new}>E_{prev}$, then the bandwidth usage limit L can be increased. L can be increased only by a factor, for example, by a multiplier, b.

In embodiments, the multiplier a is 50%. In embodiments, the multiplier b is 25%. Multipliers a and b are used while adjusting L in response to change in estimates so that the L is not changed drastically due to sudden or transient changes in network. In embodiments, where E is decreasing, L can be decreased more aggressively to avoid choking the network.

In embodiments, if $E_{new}<E_{prev}$ then $$L_{new}=L_{prev}-(E_{prev}-E_{new})\times q\times a$$

In embodiments, if $E_{new}>E_{prev}$ then $$L_{new}=L_{prev}+(E_{new}-E_{prev})\times q\times b$$

In embodiments, bandwidth limit (q) refers to the limit percentage of network bandwidth allocated to the backup.

In embodiments, each time data is sent, bandwidth estimate E is determined. Once the estimated bandwidth is reliable, the bandwidth is used to adjust bandwidth usage limit. If the estimate is not reliable, packet size is changed to make further estimates reliable. This process continues for the entire time data is sent.

Referring back to the 10 Megabits per second network bandwidth example, in order to estimate the bandwidth, the client/sender can send a 0.5 Megabit packet to the server. Since that packet size is small relative to the actual bandwidth, the packet will arrive very quickly and the estimate will likely be very high. Since the estimate is high, the conditions for bandwidth reliability will not be satisfied. Therefore, the client can send another packet with a larger size. In this example, the next packet can be 1 Megabits. That estimate will also be high, so another packet can be send, perhaps 2 Megabits. This process of increasing the packet size according to a formula continues until at least one of the bandwidth reliability conditions are met. In other words, in above example of bandwidth reliability criteria, once the estimated bandwidth is equal to or less than five times (considering x to be 5 in this example) the last transferred data payload (with some acceptable error) or the new estimates differ from previous estimates by no more than 10% the bandwidth reliability criteria is considered to be met.

For example, a packet of 0.5 Mbit can be sent to the server 110. Server 110 will receive the packet, time stamp the packet, and perform a bandwidth estimation based on the timestamp. Since the packet is small, the packet will be received almost instantaneously. Therefore, the bandwidth estimation will be high. Server 110 sends back the bandwidth estimation 120 to the client 105.

Since the bandwidth estimation is higher than expected, client 105 can send a larger test data packet. Continuing this example, client 105 can send a 1 Mbit data packet to server 110. Again, server 110, receives the packet, timestamps the packet, and performs a bandwidth estimation. Again, server 110 sends the bandwidth estimation 120 to client 105.

In embodiments, this process continues until the bandwidth estimation is reliable. In embodiments, the bandwidth is reliable when the estimate is approximately five times or smaller than the packet size. In other embodiments, a different multiplier or formula can be used to define the reliability criteria. In embodiments, the bandwidth estimation at five times the packet size is deemed to be a reliable bandwidth estimation. The bandwidth estimation continues as the data packet is sent. Further, bandwidth estimation continues so that the transfer limit can be adjusted if necessary due to a changing network bandwidth.

In embodiments, $E_{new}$ is much less than $E_{prev}$, then P can be reduced by a large amount to accommodate actual reduction in available bandwidth and avoid congestion.

Alternatively, once the error rate between successive bandwidth estimations is less than 10% the condition for bandwidth validity is satisfied and the bandwidth deemed valid.

In embodiments, every time data is sent, the bandwidth estimation process occurs. Knowing the bandwidth estimation means that the backup system can use its full available bandwidth without going over its available limits.

Figure 2:
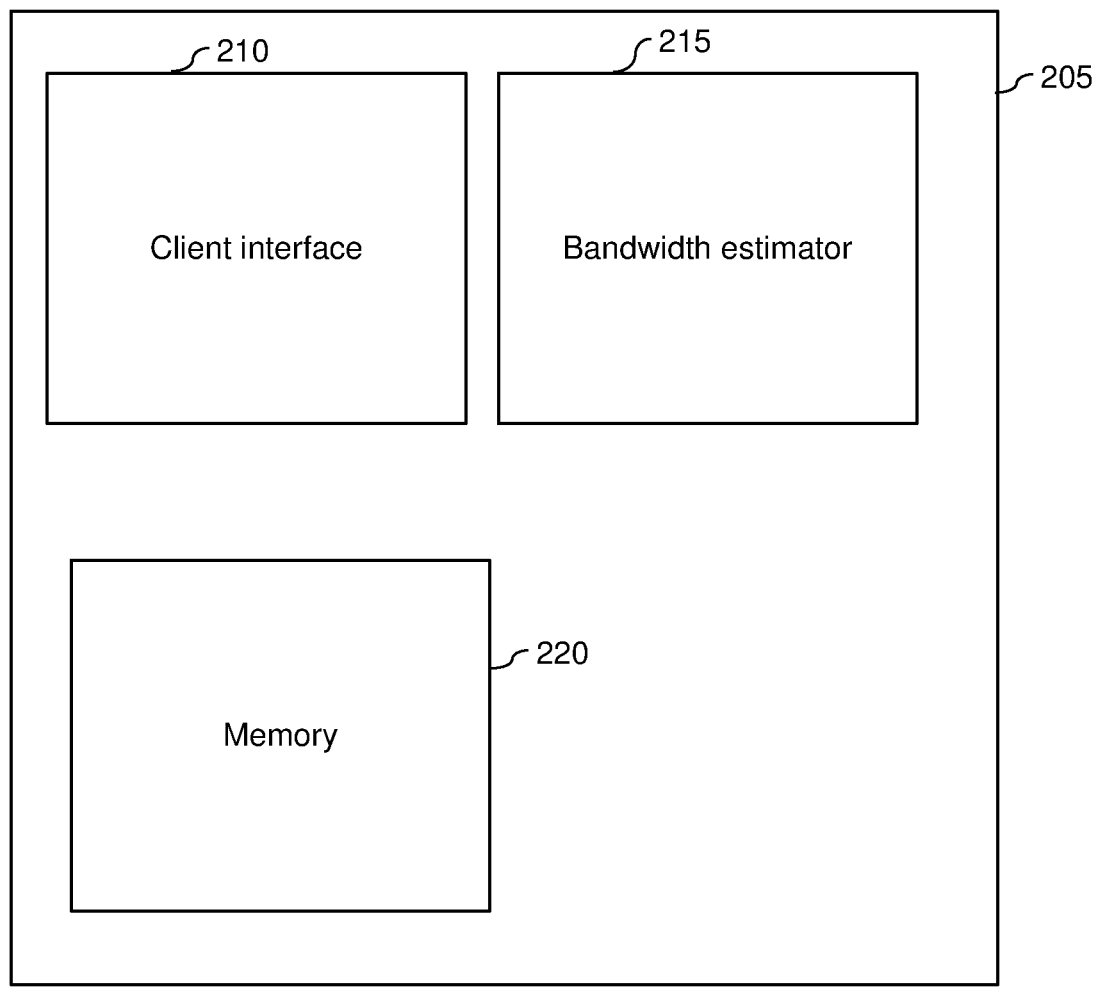
FIG. 2 depicts a block diagram of a bandwidth estimation portion of a server in a client-server backup system according to embodiments of the present disclosure.

FIG. 2 depicts a block diagram 200 of a bandwidth estimation portion of a server in a client-server backup system according to embodiments of the present disclosure. FIG. 2 shows server 205. Server 205 includes client interface 210. Client interface 210 receives data packets from the client. Client interface 210 also sends the bandwidth estimation to the client. Bandwidth estimator 215 time stamps the received data packet and performs a bandwidth estimation based on the time the packet was received. Bandwidth estimator 215 also sends the bandwidth estimation to client interface 210. Bandwidth estimator can be executed on a processor. Memory 220 stores the data packet, timestamp information, and bandwidth estimation.

Figure 3:
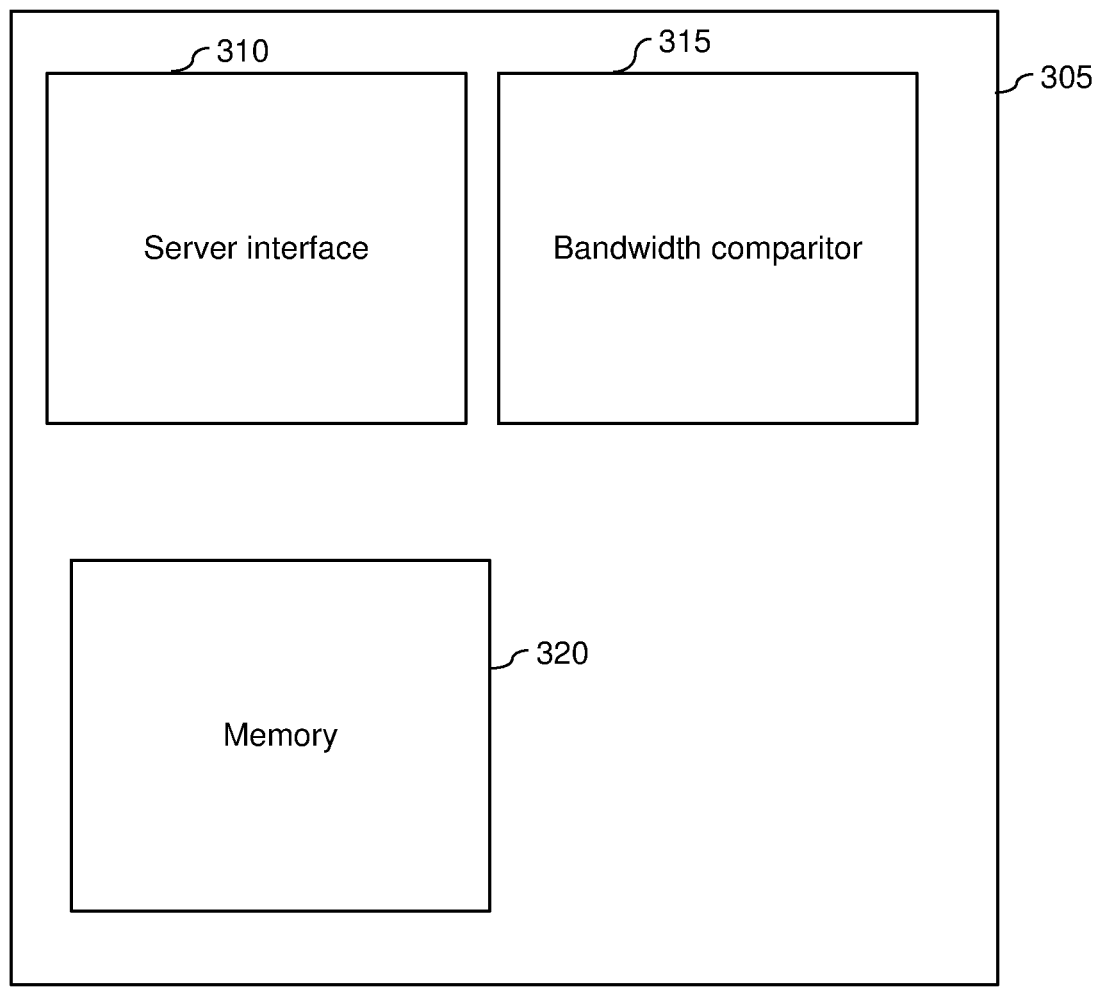
FIG. 3 depicts a block diagram of a bandwidth estimation portion of a client in a client-server backup system according to embodiments of the present disclosure.

FIG. 3 depicts a block diagram 300 of a bandwidth estimation portion of a client 305 in a client-server backup system according to embodiments of the present disclosure. FIG. 3 shows client 305 including server interface 310. Server interface 310 sends a data packet to the server. The server estimates network bandwidth as discussed above. Server interface 310 also receives bandwidth estimation information from the server. Memory 320 stores the data packets, including meta data information, for example, the data packet size, and the bandwidth estimation. Bandwidth comparator compares the bandwidth estimation to the data packets size. If the bandwidth estimation has met estimate reliability criteria, then the bandwidth estimation is a reliable one and the client can stop sending to the server and begin sending data packets using transfer limit, L, and packet size, P, to the server.

Figure 4:
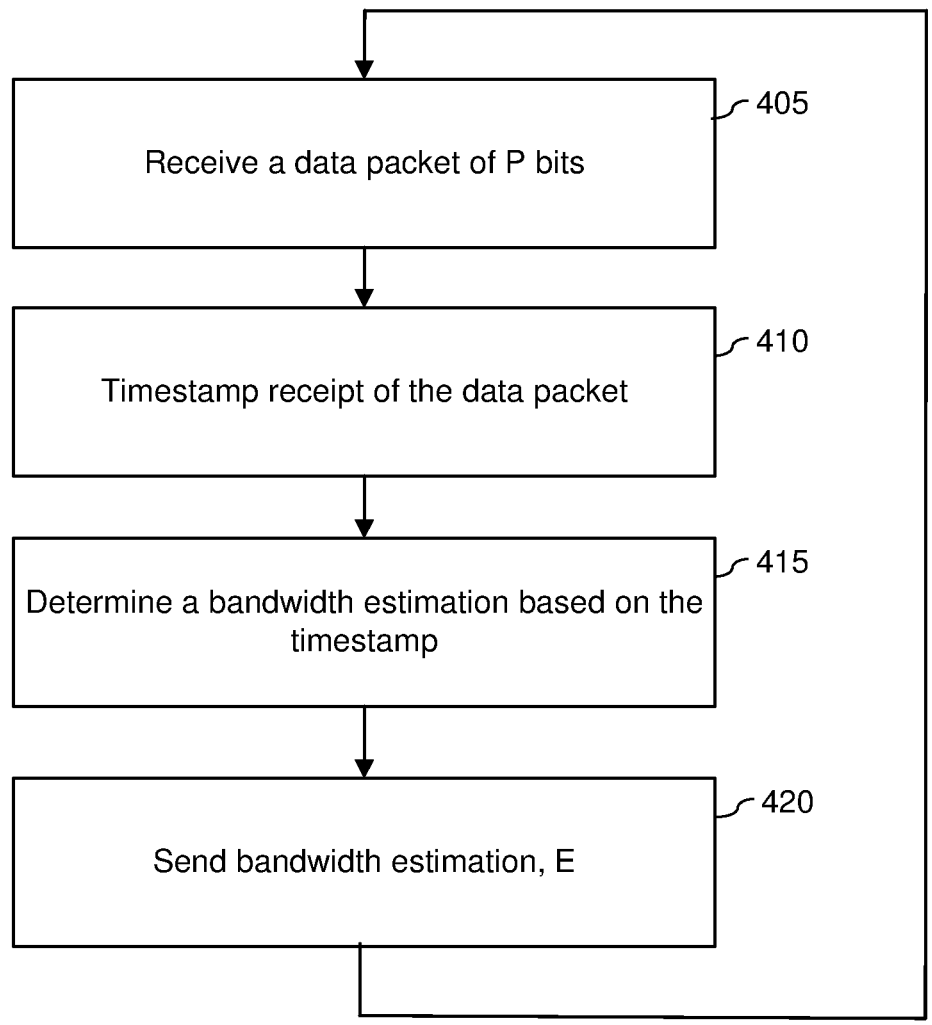
FIG. 4 depicts a flow chart of a client-server backup according to embodiments of the present invention.

FIG. 4 depicts a flow chart 400 of a client-server backup according to embodiments of the present invention. FIG. 4 shows embodiments of a flow chart of a server side of a client-server backup. FIG. 4 shows the server receiving a data packet 405. The data packet can be sent by the client to estimate the network bandwidth. The server timestamps receipt of the data packet 410. Server determines a bandwidth estimation 415 and sends the bandwidth estimation to the client 420. Server repeats the flow 400 for every payload it receives.

Figure 5:
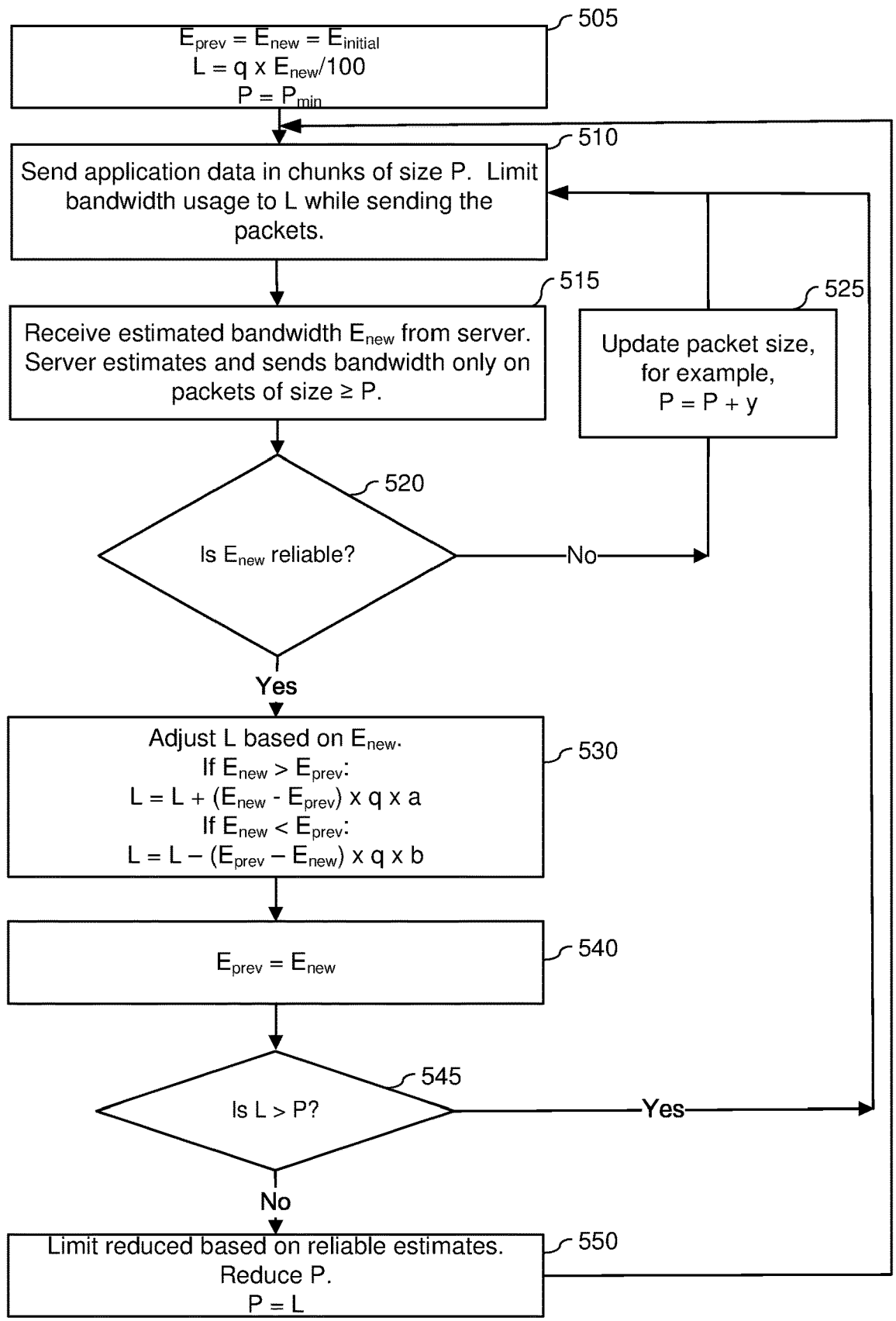
FIG. 5 depicts a flow chart of a client-server backup according to embodiments of the present invention.

FIG. 5 depicts a flow chart 500 of a client-server backup according to embodiments of the present invention. FIG. 5 shows the client side of a client-server backup. FIG. 5 shows initializing E by setting $E_{prev}$ equal to $E_{new}$ equal to $E_{initial}$ 505. FIG. 5 also shows sending application data in chunks of size P. Limiting bandwidth usage to L while sending the packets 510. FIG. 5 also shows receiving estimated bandwidth $E_{new}$ from the server. The server estimates and sends the bandwidth estimate only on packets of size greater than or equal to P 515. $E_{new}$ is checked for reliability 520. If $E_{new}$ is not reliable, then update the packet size 525. One example of a way the packet size can be updated is by increasing P by y 525.

If $E_{new}$ is reliable, then adjust L based on $E_{new}$ 530. If $E_{new}$ is greater than $E_{prev}$, then:

$$L=L+(E_{new}-E_{prev}) \times q \times a$$

If $E_{new}$ is less than $E_{prev}$, then:

$$L=L+(E_{new}-E_{prev}) \times q \times b$$

Set $E_{prev}=E_{new}$ 540. FIG. 5 also shows checking to see if L is greater than P 545. If L is greater than P, then send the application data in chunks of P and limit the bandwidth usage to L while sending the packets 510. If L is not greater than P, then the limit is reduced based on reliable estimates 550. P is reduced and P is set equal to L 550. Then send the application data in chunks of P and limit the bandwidth usage to L while sending the packets 510.

It shall be noted that although certain steps of FIGS. 4 and 5 are described as occurring on the client or the server that any step can occur on either the client or the server.

Figure 6:
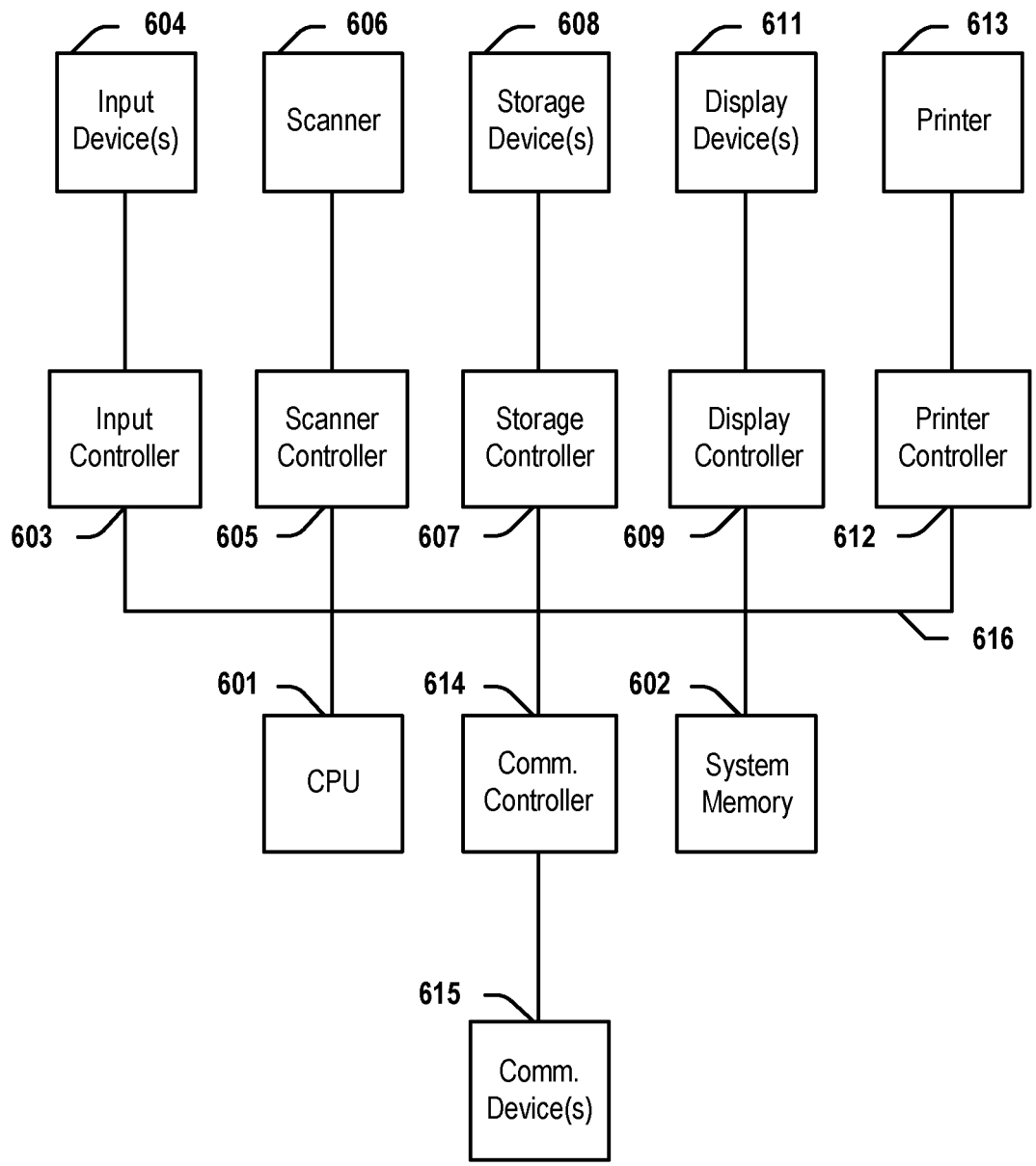
FIG. 6 depicts a block diagram of a computer system 600 according to embodiments of the present invention.

FIG. 6 depicts a block diagram of a computer system 600 according to embodiments of the present invention. It will be understood that the functionalities shown for system 600 may operate to support various embodiments of an information handling system—although it shall be understood that an information handling system may be differently configured and include different components. As illustrated in FIG. 6, system 600 includes a central processing unit (CPU) 601 that provides computing resources and controls the computer. CPU 601 may be implemented with a microprocessor or the like, and may also include a graphics processor and/or a floating-point coprocessor for mathematical computations. System 600 may also include a system memory 602, which may be in the form of random-access memory (RAM) and read-only memory (ROM).

A number of controllers and peripheral devices may also be provided, as shown in FIG. 6. An input controller 603 represents an interface to various input device(s) 604, such as a keyboard, mouse, or stylus. There may also be a scanner controller 605, which communicates with a scanner 606. System 600 may also include a storage controller 607 for interfacing with one or more storage devices 608 each of which includes a storage medium such as magnetic tape or disk, or an optical medium that might be used to record programs of instructions for operating systems, utilities and applications which may include embodiments of programs that implement various aspects of the present invention. Storage device(s) 608 may also be used to store processed data or data to be processed in accordance with the invention. System 600 may also include a display controller 609 for providing an interface to a display device 611, which may be a cathode ray tube (CRT), a thin film transistor (TFT) display, or other type of display. The computing system 600 may also include a printer controller 612 for communicating with a printer 613. A communications controller 614 may interface with one or more communication devices 615, which enables system 600 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A system configured to receive files from a client device, the system comprising:
a processor; and
a memory storing computer code comprising instructions, the instructions, when executed by the processor, cause the processor to:
receive, from the client device, a first data packet corresponding to one of the files, the first data packet of a first size;
timestamp the first data packet with a first timestamp;
determine, by the processor of the system that receives the first data packet, a first bandwidth estimate associated with the client device based on the first timestamp;
send the first bandwidth estimate to the client device, the client device increasing sizes of subsequent data packets corresponding to the files until the system determining that one or more bandwidth estimate reliability criteria are met, the sizes of the subsequent data packets limited as fractions of subsequent bandwidth estimates;
set a bandwidth limit for transmission of the files, the bandwidth limit being a fraction of a reliable bandwidth estimate.

2. The system of claim 1, wherein one of the bandwidth estimate reliability criteria is a set of mathematical conditions.

3. The system of claim 1, wherein one of the bandwidth estimate reliability criteria comprises a condition where the size of one of the subsequent data packets is greater than or equal to a fraction of a length of the data that can be transferred in a second when transferred at a rate equal to an estimated bandwidth.

4. The system of claim 1, wherein at least one of the sizes of the subsequent data packets is a function of the first data size.

5. The system of claim 1, wherein each of the subsequent data packets is greater than a preceding one.

6. The system of claim 1, wherein at least one of the sizes of the subsequent data packets is a function of the first bandwidth estimation.

7. The system of claim 1, wherein the instructions, when executed, further cause the processor to adjust a transfer limit per second, L, based on a change in bandwidth estimation.

8. The system of claim 1, wherein the system sets a threshold of a percentage of available bandwidth to be used by an application.

9. The system of claim 1, wherein the system is used in a data backup system.

10. The system of claim 1, wherein the system is used in a data recovery system.

11. The system of claim 1, wherein the system is a backup server, and the files from the client device comprise backup files of the client device.

12. A method comprising:
receiving, by a system from a client device having files, a first data packet corresponding to one of the files, the first data packet of a first data size; and
timestamping the first data packet with a first timestamp;
determining, by the system that receives the first data packet, a first bandwidth estimate associated with the client device based on the first timestamp;
sending the first bandwidth estimate to the client device, the client device increasing sizes of subsequent data packets corresponding to the files until the system determining that one or more bandwidth estimate reliability criteria are met, the sizes of the subsequent data packets limited as fractions of subsequent bandwidth estimates;
setting a bandwidth limit for transmission of the files, the bandwidth limit being a fraction of a reliable bandwidth estimate.

13. The method of claim 12, wherein one of the bandwidth estimate reliability criteria is a set of mathematical conditions.

14. The method of claim 12, wherein one of the bandwidth estimate reliability criteria comprises a condition where the size of one of the subsequent data packets is greater than or equal to a fraction of a length of the data that can be transferred in a second when transferred at a rate equal to an estimated bandwidth.

15. The method of claim 12, wherein at least one of the sizes of the subsequent data packets is a function of the first data size.

16. The method of claim 12, wherein each of the subsequent data packets is greater than a preceding one.

17. The method of claim 12, wherein at least one of the sizes of the subsequent data packets is a function of the first bandwidth estimation.

18. The method of claim 12, further comprising adjusting a transfer limit per second, L, based on a change in bandwidth estimation.

19. The method of claim 12, further comprising setting a threshold of a percentage of available bandwidth to be used by an application.

20. The method of claim 12, wherein the system is a backup server, and the files from the client device comprise backup files of the client device.

* * * * *